(12) United States Patent
Jahkonen

(10) Patent No.: US 8,053,931 B2
(45) Date of Patent: Nov. 8, 2011

(54) POWER CONTROL OF TRANSPORT SYSTEM

(75) Inventor: Pekka Jahkonen, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 35 days.

(21) Appl. No.: 12/642,369

(22) Filed: Dec. 18, 2009

(65) Prior Publication Data

US 2010/0096931 A1 Apr. 22, 2010

Related U.S. Application Data

(63) Continuation of application No. PCT/FI2008/000072, filed on Jun. 16, 2008.

(30) Foreign Application Priority Data

Jun. 20, 2007 (FI) ..................................... 20070489
Dec. 17, 2007 (FI) ..................................... 20070986

(51) Int. Cl.
*H02J 1/00* (2006.01)
(52) U.S. Cl. ........................................................ 307/82
(58) Field of Classification Search ..................... 307/80, 307/64
See application file for complete search history.

(56) References Cited

U.S. PATENT DOCUMENTS

| | | | |
|---|---|---|---|
| 5,631,813 A | 5/1997 | Ikeshita | |
| 6,118,676 A * | 9/2000 | Divan et al. | ..................... 363/34 |
| 6,732,838 B1 | 5/2004 | Okada et al. | |
| 7,138,728 B2 * | 11/2006 | LeRow et al. | ..................... 307/30 |
| 2003/0007366 A1 | 1/2003 | Drummond et al. | |
| 2005/0173198 A1 | 8/2005 | Takehara et al. | |
| 2005/0258795 A1 | 11/2005 | Choi | |
| 2010/0117566 A1 * | 5/2010 | Jahkonen | ..................... 318/376 |

FOREIGN PATENT DOCUMENTS

| | | |
|---|---|---|
| EP | 0 703 182 A2 | 3/1996 |
| EP | 1 503 493 | 2/2005 |
| GB | 2111251 A | 6/1983 |

* cited by examiner

*Primary Examiner* — Michael Rutland Wallis
(74) *Attorney, Agent, or Firm* — Birch, Stewart, Kolasch and Birch, LLP

(57) ABSTRACT

The power control of a transport system comprises an electric motor for moving the transport appliance as well as a power supply appliance of the motor, which comprises an intermediate circuit. The power supply appliance of the motor is fitted between the power source and the electric motor. The transport system further comprises a rectifier of the intermediate circuit power, which is fitted between the intermediate circuit of the power supply appliance of the motor and the supplied load for transmitting intermediate circuit power to the supplied load.

25 Claims, 4 Drawing Sheets

POWER CONTROL OF TRANSPORT SYSTEM

This application is a Continuation of PCT/FI2008/000072 filed on Jun. 16, 2008, and claims priority under 35 U.S.C. §119(a) on Patent Application Nos. 20070489 and 20070986 filed in Finland on Jun. 20, 2007 and Dec. 17, 2007, respectively, all of which are hereby expressly incorporated by reference into the present application.

FIELD OF THE INVENTION

The object of the invention is a rectifier of the intermediate circuit power as defined in the preamble of claim 1, a power control of a transport system as defined in the preamble of claim 2, and a method for controlling the power of a transport system as defined in the preamble of claim 10.

PRIOR ART

In a transport system power is supplied to the motor for moving the transport appliance. Power supply to the motor generally occurs by means of an inverter. When braking the transport appliance, power also returns from the motor to the DC intermediate circuit of the inverter, where it is often converted into heat, especially in low-power systems, in a separate power resistor. There are also applications in which the braking power of the motor is returned to the network by means of a mains AC rectifier. In this case a separate, application-specific appliance for handling braking power is fitted in connection with the inverter.

Figure 1:
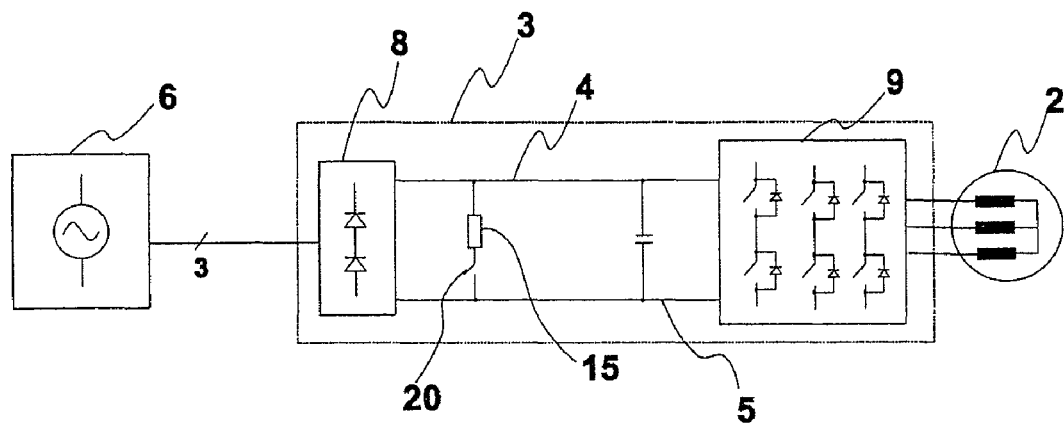

The power resistor that consumes braking power is conventionally fitted to the DC intermediate circuit of the inverter via a controlling switch, i.e. a brake chopper, between the positive and the negative intermediate circuit busbar, e.g. in the manner presented in FIG. 1. When the switch is conducting, the power resistor consumes the intermediate circuit power as heat. When the motor brakes, the intermediate circuit voltage starts to rise, and resistor braking starts up when the voltage has reached a limit value, which can be as much as 700 volts. In this case the voltage endurance of the power resistor must be dimensioned in accordance with the intermediate circuit voltage.

During resistor braking the current and the voltage of the power resistor vary according to the switching frequency of the brake chopper, and the speeds of changes in the current and voltage roughly correspond to the rise and fall times of the switch of the brake chopper. This kind of great speed of change in the voltage and current produces high-frequency EMC disturbances, which must be taken into account in designing the interference suppression of the appliance. In this case special protectively screened cable must generally be used in the supply cables of the power resistor.

PURPOSE OF THE INVENTION

The purpose of this invention is to solve the aforementioned problems of prior art as well as the problems presented in the description of the invention below. Thus a rectifier of the intermediate circuit power is presented in the invention, by means of which the supplied load can be controlled more versatilely than in prior art.

CHARACTERISTIC FEATURES OF THE INVENTION

The rectifier of the intermediate circuit power according to the invention is characterized by what is disclosed in the characterization part of claim 1. The power control of a transport system according to the invention is characterized by what is disclosed in the characterization part of claim 2. The method according to the invention for controlling the power of a transport system is characterized by what is disclosed in the characterization part of claim 10. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

The power supply appliance of the intermediate circuit according to the invention can be e.g. a single-phase or a multiphase inverter. The power supply appliance of the motor according to the invention can be a controller of an AC motor, such as a frequency converter or on the other hand the power supply appliance can comprise e.g. a power rectifier of an H-bridge DC motor.

The transport system referred to in the invention can be, for instance, an elevator system, an escalator system, a travelator system or a crane system. A transport appliance refers in this context to a part of a transport system that is used to move the transported load, such as passengers or goods.

The rectifier of intermediate circuit power according to the invention contains interfaces to the intermediate circuit of the power supply appliance as well as to the supplied load. The aforementioned power supply appliance of the intermediate circuit contains interfaces to a first power source as well as to a second power source. The aforementioned rectifier of the intermediate circuit power contains a control, in which is an input for the signal indicating the power supply of the second power source. The control is fitted to control the rectifier of the intermediate circuit power in response to the aforementioned signal indicating the power supply of the second power source, for supplying to the load the power transmitted to the intermediate circuit from the second power source. The aforementioned rectifier of the intermediate circuit power is single-phase, comprising a choke as well as a changeover switch. The choke is fitted between the first connection point of the supplied load and the output of the changeover switch, at least two capacitors in series are connected in parallel with the changeover switch, and the second connection point of the supplied load is connected between the capacitors.

The aforementioned signal indicating the power supply of the second power source can comprise e.g. data about some electrical magnitude of the power supply appliance of the second power source or of the intermediate circuit, such as about the voltage, current or instantaneous power.

The aforementioned first power source can be, for instance, an electricity network or a generator.

The aforementioned second power source can be, for instance, a generator, a motor, an accumulator, a supercapacitor, a fuel cell, or the power supply of a solar panel.

The power control of a transport system according to the invention comprises an electric motor for moving the transport appliance as well a power supply appliance of the motor, which comprises an intermediate circuit and which power supply appliance of the motor is fitted between the power source and the electric motor. The power control further comprises a single-phase rectifier of the intermediate circuit power, which single-phase rectifier of the intermediate circuit power is fitted between the intermediate circuit of the power supply appliance of the motor and the supplied load, for supplying onwards to the load the power returning to the intermediate circuit from the electric motor. The single-phase rectifier of the intermediate circuit power comprises a choke as well as a changeover switch. The choke is fitted between the first connection point of the supplied load and the output of the changeover switch of the rectifier of the intermediate circuit power, at least two capacitors in series are connected in parallel with the changeover switch, and the second connection point of the supplied load is connected between the capacitors. The aforementioned power source can be, for instance, an electricity network or a generator.

In one power control according to the invention the rectifier of the intermediate circuit power is fitted to supply power from the intermediate circuit of the power supply appliance of the motor to a phase of the electricity network.

One power control according to the invention comprises at least two aforementioned single-phase rectifiers of the intermediate circuit.

In one embodiment of the invention three aforementioned single-phase rectifiers of the intermediate circuit power are fitted to the power control of the transport system, for supplying power from the intermediate circuit of the power supply appliance of the motor to a three-phase electricity network. In this case each of the aforementioned single-phase rectifiers of the intermediate circuit power is connected to a different phase of the aforementioned three-phase electricity network.

In one power control according to the invention the rectifier of the intermediate circuit power can be controlled according to the load connected. The control of the rectifier of the intermediate circuit power can in this case vary depending on the supplied load, and the current supplied and the frequency of the voltage can change. With the control of the rectifier it is possible to implement e.g. a supply voltage at the generally used 50 hertz frequency and with a nominal value of 230 volts, in which case different loads connected to a normal 230 volt electricity network can be supplied with the rectifier of the intermediate circuit power. The frequency of the supply voltage can, if necessary, also be increased and e.g. a transformer can be supplied with this higher-frequency voltage, in which case the power density of the transformer is greater than with conventional 50 hertz transformers.

In one power control according to the invention the supplied load comprises a power resistor.

In one power control according to the invention the supplied load comprises a power supply of the electrification of a transport system.

In one power control according to the invention the positive and negative changeover contacts of the rectifier of the intermediate circuit power can be controlled into a conductive state simultaneously for dynamic braking of the motor.

In one power control according to the invention the rectifier of the intermediate circuit power comprises a definition of the power to be supplied to the load.

One rectifier of the intermediate circuit power according to the invention comprises a measurement of the current of the load, and the status of the load is in this case estimated on the basis of the measured current.

In the method according to the invention for controlling the power of a transport system a power supply appliance of the motor is fitted between the power source and the electric motor; a single-phase rectifier of intermediate circuit power is fitted between the intermediate circuit of the power supply appliance and the supplied load; a changeover switch is fitted in the single-phase rectifier of the of the intermediate circuit power; a choke is fitted between the output of the changeover switch and the first connection point of the supplied load; at least two capacitors in series are connected in parallel with the aforementioned changeover switch; and also a second connection point of the supplied load is connected between the capacitors.

In one method according to the invention for controlling the power of a transport system the intermediate circuit voltage is measured; the power supply from the intermediate circuit to the supplied load is started after the intermediate circuit voltage has exceeded the limit value of voltage; and also the power supply from the intermediate circuit to the supplied load is stopped after the intermediate circuit voltage has fallen below the limit value of voltage.

In one power control according to the invention the rectifier control comprises a first and a second limit value of intermediate circuit voltage, of which the first limit value is greater than the second limit value. The rectifier of the intermediate circuit power is in this case fitted to start the power supply from the intermediate circuit to the supplied load after the intermediate circuit voltage has exceeded the first limit value and to stop the power supply from the intermediate circuit to the supplied load after the intermediate circuit voltage has fallen below the second limit value. In other words, in this case the first and the second limit value form hysteresis limits for the starting and the stopping of the power supply.

In another power control according to the invention the rectifier control comprises only one limit value. The rectifier of the intermediate circuit power is in this case fitted to start the power supply from the intermediate circuit to the supplied load after the intermediate circuit voltage has exceeded the limit value and to stop the power supply after the intermediate circuit voltage has fallen below the limit value.

In one embodiment of the invention a wire is connected between the capacitors of the rectifier of the intermediate circuit power, the other end of which is connected to the second connection point of the supplied load. In one embodiment of the invention at least one interference filtering choke is connected in series with the aforementioned wire for filtering interference caused by the rectifier of the intermediate circuit power. The aforementioned choke can be an RF choke, in which case it is used for filtering only high-frequency, over 150 kilohertz, interference. The choke can also be intended for filtering lower-frequency interference, such as changes in the current of the switching frequencies of the rectifier of the intermediate circuit power. It is also possible that the choke connected in series with the lead between the output of the changeover switch of the rectifier of the intermediate circuit power and the first connection point of the supplied load is divided into two parts, and the second of the aforementioned chokes is fitted in place of the interference filtering choke or in series with the interference filtering choke. In one embodiment of the invention the interference filtering also comprises at least one capacitor.

In one power control according to the invention a controllable switch, which is fitted to close when the intermediate circuit voltage has reached a pre-determined limit value, is fitted in series with at least one choke. The pre-determined limit value can be, for instance, 350 volts.

In one power control according to the invention the rectifier of the intermediate circuit power comprises a rectifier control, which comprises a reference value of the current of the supplied load formed on the basis of the measurement of the intermediate circuit voltage. The rectifier of the intermediate circuit power is in this case fitted to adjust the current of the load to be connected according to the reference value with the rectifier control.

The supplied load can comprise an accumulator set and/or a supercapacitor, or the charging device of these.

In one embodiment of the invention IGBT transistors are preferably used as the changeover contacts of the changeover switches of the rectifier of the intermediate circuit power.

In one embodiment of the invention the aforementioned single-phase rectifier of the intermediate circuit power is integrated into the aforementioned power supply appliance of the motor. In this case at least a part of the main circuit of the rectifier of the intermediate circuit power, such as the changeover switch and the capacitors, is integrated into the main circuit of the power supply appliance of the motor, e.g. onto the same circuit board. It is also possible that the control of the single-phase rectifier of the intermediate circuit power is integrated into the control of the power supply appliance of the motor, in which case it can be implemented e.g. on the same microprocessor.

ADVANTAGES OF THE INVENTION

With the invention at least one of the following advantages, among others, is achieved:

With the rectifier of the intermediate circuit power it is possible to supply intermediate circuit power, such as braking energy returning from the motor of the transport system, to different loads to be supplied. The supplied load can be diversely selected, and the rectifier of the intermediate circuit power can be controlled according to the load connected. The supply voltage and the current of the supplied load can in this case be fitted on the basis of the supplied load, in which case the frequency and amplitude of the current and the voltage can be selected according to the dimensioning of the supplied load. When the variation of the switching frequency of the current and voltage of the supplied load diminishes, it is also possible to manage with less interference protection than in prior art.

When the power resistor that consumes the braking power of the motor is supplied with the rectifier of the intermediate circuit power according to the invention, the supply voltage of the power resistor can be selected according to the voltage endurance of the resistor, in which case it is possible to select, for instance, the generally used resistors dimensioned for a voltage endurance of 230 volts as the power resistor.

When the power supply of the electrification of the transport system occurs via the rectifier of the intermediate circuit power, the braking power of the motor can be used as an energy source of the electrification of the transport system, in which case the efficiency ratio of the transport system improves.

The rectifier of the intermediate circuit power according to the invention can also, if necessary, be fitted to supply power to the electricity network, in which case the braking power of the motor can be returned back to the network, and the efficiency ratio of the transport system improves.

By means of the rectifier of the intermediate circuit power it is also possible to implement so-called dynamic braking, in which case the positive and negative changeover contact of the rectifier are controlled into a conductive state simultaneously. In this case the source voltage produced in the phases of the motor by the movement of the motor short circuits via the serial connection of the changeover contacts of the rectifier of the intermediate circuit power, and the short circuit current brakes the movement of the motor.

The rectifier of the intermediate circuit power can also determine the power of the supplied load e.g. by means of the voltage and current of the load. In this case on the basis of the input power the rectifier can e.g. estimate the warming of the power resistor functioning as the supplied load, and determine any overheating of the resistor, in which case the operation of the transport system can if necessary be stopped when the safety of the transport system is endangered.

The status of the supplied load can be estimated from the measurement of the current of the supplied load. For example, a poor connection of the supply cables of the power resistor can be detected as an interruption of the passage of current, in which case the operation of the transport system can be halted. Fault data about malfunctioning of the load can also if necessary be sent to the service center.

PRESENTATION OF DRAWINGS

Figure 2:
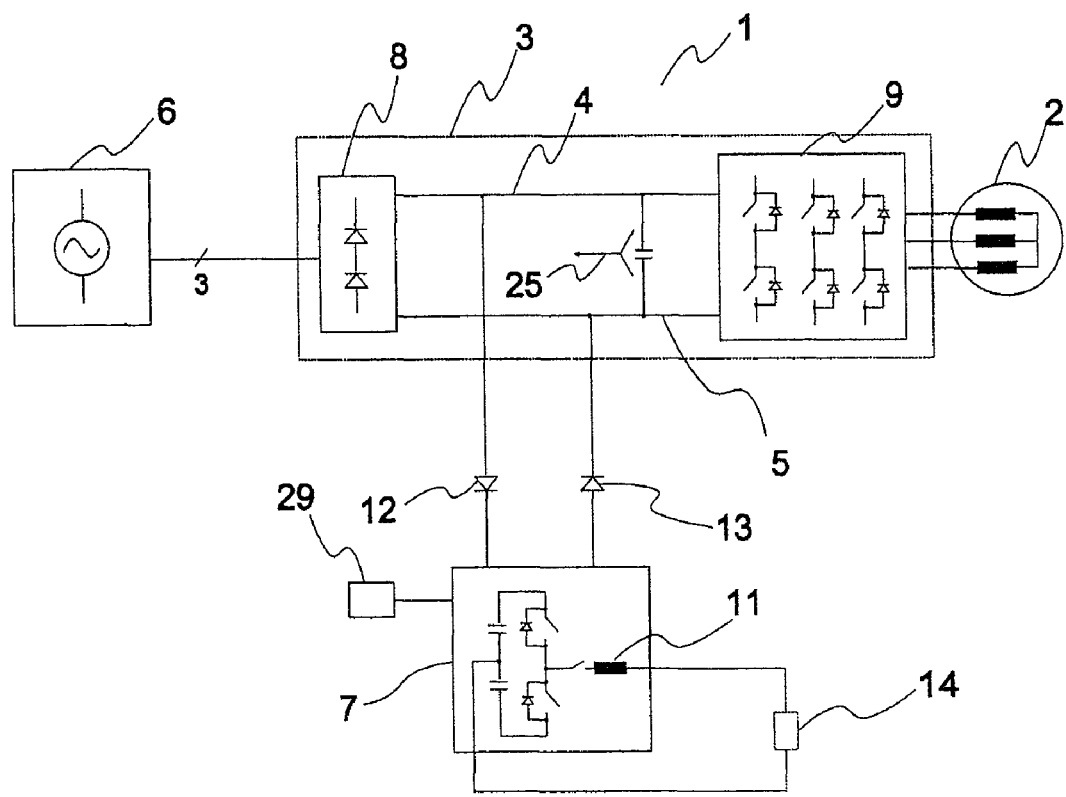
Figure 3:
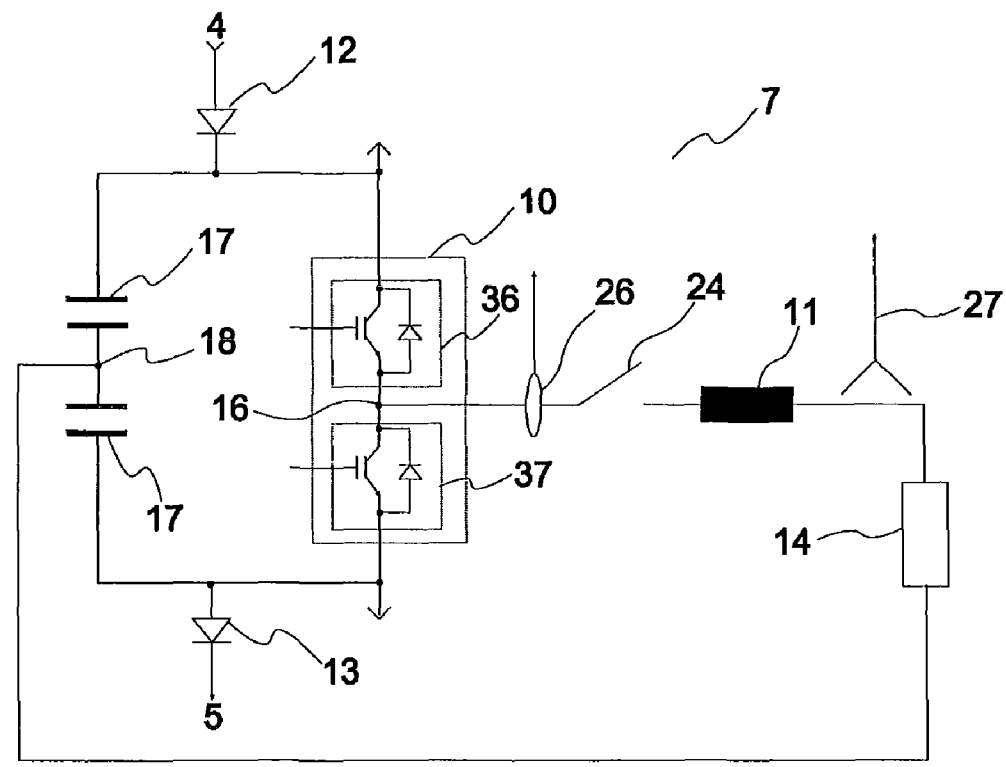
Figure 4:
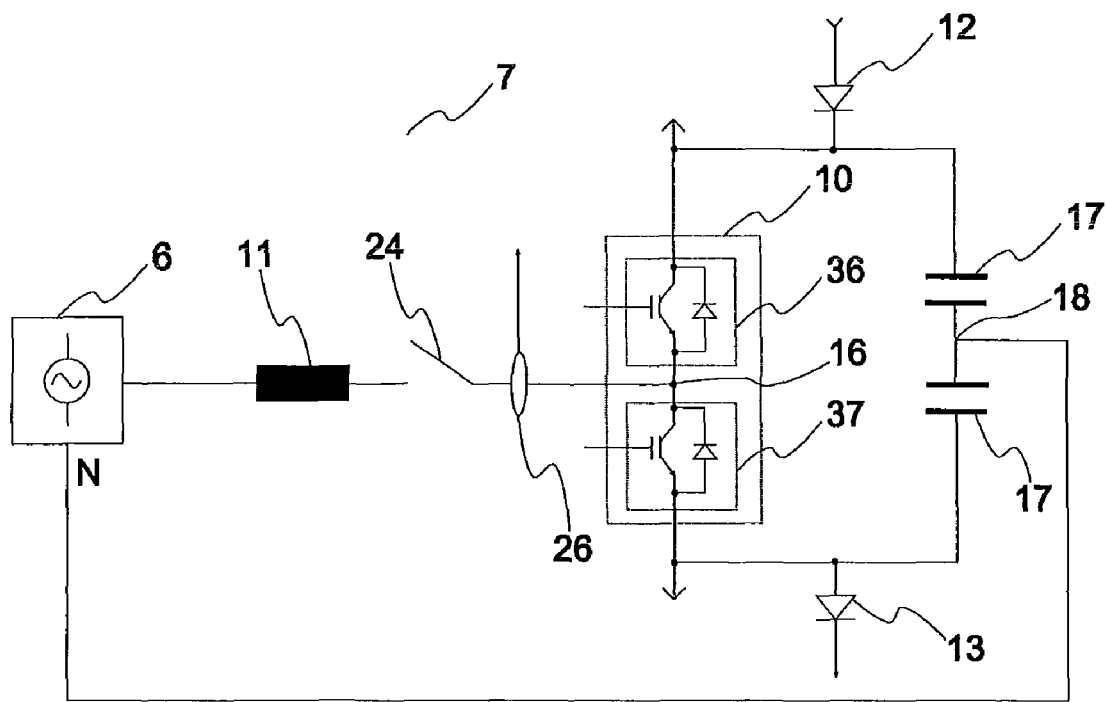
Figure 5:
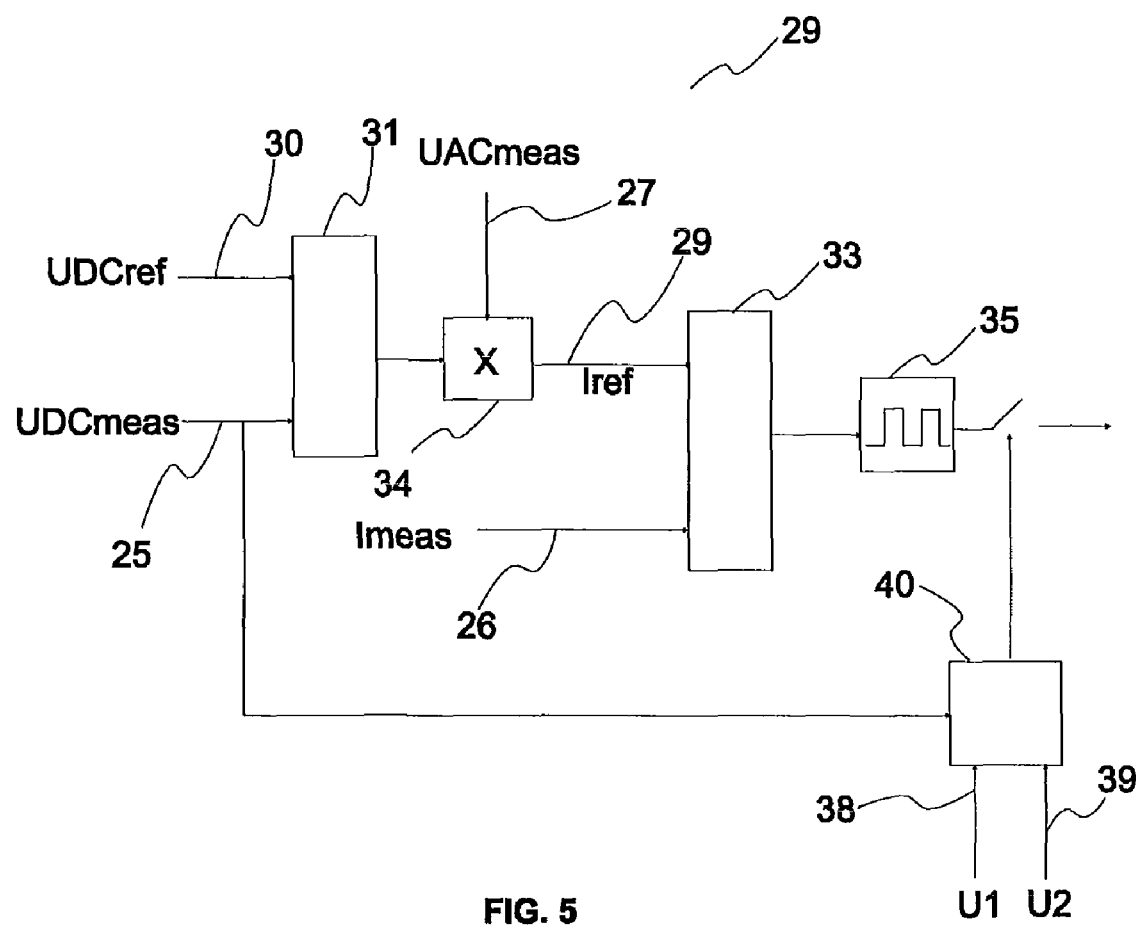

In the following, the invention will be described in more detail by the aid of a few examples of its embodiments with reference to the attached drawings, wherein FIG. 1 presents a power control of a transport system according to prior art FIG. 2 presents a power control of a transport system according to the invention FIG. 3 presents a rectifier of the intermediate circuit power according to the invention FIG. 4 presents a rectifier control as a block diagram FIG. 5 presents a rectifier control of the rectifier of the intermediate circuit power.

Figure 6:
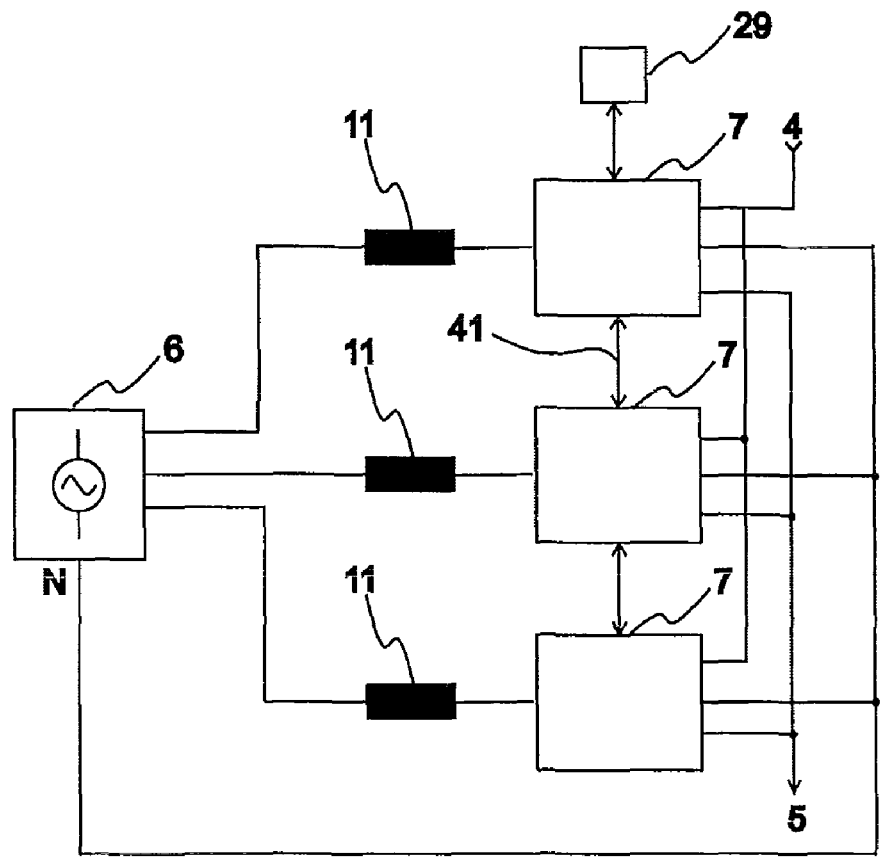
Figure 7:
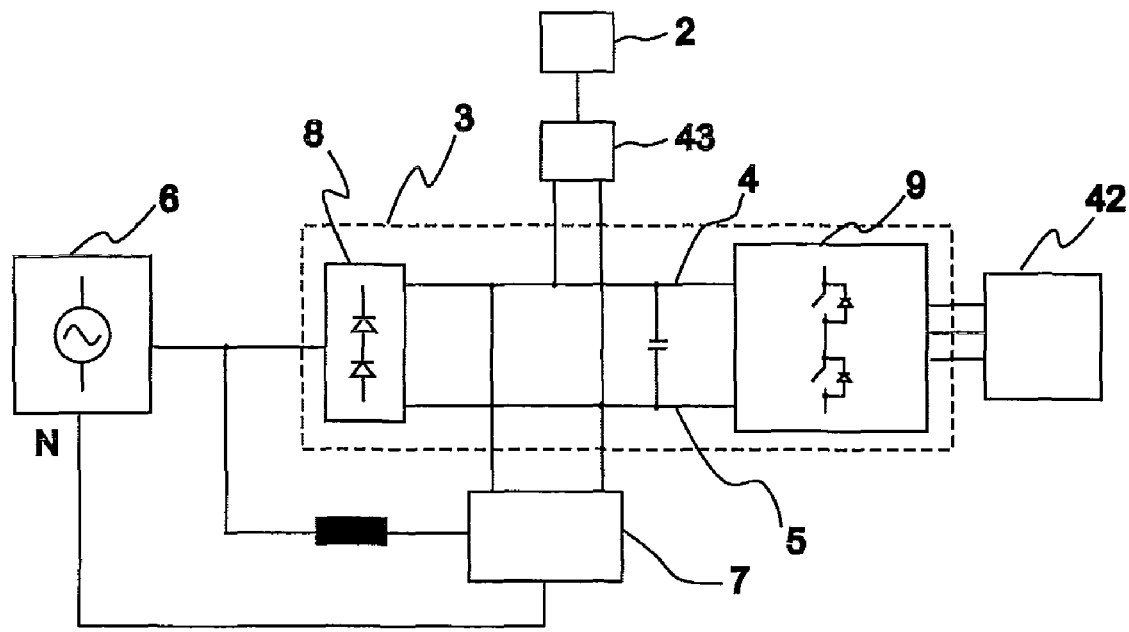

FIG. 6 presents an embodiment of the invention, which contains three single-phase rectifiers of the intermediate circuit power FIG. 7 presents an embodiment of the invention, in which a power supply of a solar panel is fitted FIG. 1 presents a power control of a transport system according to prior art. The frequency converter 3 comprises a rectifier 8, a DC intermediate circuit 4,5 and an inverter 9. The rectifier 8 converts the three-phase voltage of the electricity network 6 into DC voltage to the DC intermediate circuit, and the inverter 9 further converts the voltage of the DC intermediate circuit into the variable frequency and variable amplitude supply voltage of the motor. Power supply by means of the frequency converter according to FIG. 1 is possible only from the electricity network 6 towards the motor 2. In the transport system during motor braking, however, power also returns from the motor back to the DC intermediate circuit 4,5 and in this case the power is consumed in the power resistor 15 as heat. When the power starts to return from the motor to the intermediate circuit, the intermediate circuit voltage starts to rise. The frequency converter 3 registers the rise in voltage, and connects the switch 20, i.e. the brake chopper, into a conductive state. In this case the power resistor 15 connects between the positive 4 of the DC intermediate circuit and the negative intermediate circuit busbar, and current starts to travel in the power resistor 15. This so-called resistor braking can start e.g. after the intermediate circuit voltage has risen to 700 volts, in which case the power resistor 15 must be dimensioned to withstand this kind of high intermediate circuit voltage.

FIG. 2 presents a power control of a transport system according to the invention. In this embodiment of the invention the transport system is an elevator system, but a corresponding power control is also suited to many different transport systems. In this context the power supply appliance 3 of the elevator motor is a frequency converter, comprising a rectifier 8, an intermediate circuit 4,5 and an inverter 9. The frequency converter 3 supplies power from the electricity network 6 to the motor 2 that moves the elevator car (not shown in the figure). The power control also comprises a rectifier 7 of the intermediate circuit power, which is fitted between the intermediate circuit 4,5 of the power supply appliance of the motor and the supplied load 14. In this context the supplied load 14 is the power resistor, but the load can also be e.g. the power supply of the electrification of an elevator system, in which case it is possible to supply the intermediate circuit power of the frequency converter e.g. to the control electronics of the elevator, to the electrification of the elevator shaft or to the lighting of the elevator. Since power returns from the elevator motor 2 to the DC intermediate circuit 4,5 during generator operation of the elevator, the returning power can in this case be utilized in the electrification of the elevator system, in which case the efficiency ratio of the elevator system improves. The rectifier 7 of the intermediate circuit power can also be fitted to supply power from the intermediate circuit 4,5 of the frequency converter to a phase of the electricity network 6.

The rectifier 7 of the intermediate circuit power comprises a rectifier control 29, with which the power from the intermediate circuit 4,5 of the frequency converter to the supplied load 14 is controlled. The rectifier control starts up after the intermediate circuit voltage has risen above the pre-determined first limit value 38, and stops after the intermediate circuit voltage has fallen below the second pre-determined limit value 39. In other words, the limit values form hysteresis limits for the rectifier control, in which case it is not possible that with a certain value of intermediate circuit voltage the control would start to switch on and off at a high frequency.

FIG. 3 describes a rectifier 7 of the intermediate circuit power according to the invention in more detail. The rectifier comprises a choke 11 as well as a changeover switch 10. The choke 11 is fitted between the first connection point of the supplied load 14 and the output 16 of the changeover switch of the rectifier of the intermediate circuit power. Two capacitors 17 in series are connected in parallel with the changeover switch 10, and the second connection point of the supplied load 14 is connected between the capacitors 18. A controllable switch 24 is also fitted in series with the choke 11. By means of the controllable switch the supplied load 14 can, if necessary, be isolated from the rectifier 7 of the intermediate circuit power.

The rectifier 7 of the intermediate circuit power also comprises a measurement 26 of the current of the choke 11 as well as a measurement 27 of the voltage of the supplied load 14. The rectifier 7 of the intermediate circuit power endeavors to adjust the current of the choke 11 with the rectifier control 29. The magnitude of the current is changed by switching the positive 36 or the negative 37 changeover contact of the changeover switch 10 in turns to the potential of the positive 4 and the negative 5 busbar of the intermediate circuit of the frequency converter. Pulse-width modulation (PWM modulation) is used for the control of the switches. IGBT transistors are used as the changeover contacts. The rectifier of the intermediate circuit power defines the power of the supplied load 14 by means of the measurements of the voltage 27 and the current 26 of the supplied load.

FIG. 4 describes a rectifier 7 of the intermediate circuit power according to the invention fitted to supply power from the intermediate circuit 4,5 of the frequency converter to a phase of the electricity network 6. The neutral wire N of the electricity network 6 is connected between the capacitors 18. A choke 11 is connected between the output 16 of the changeover switch and a phase of the electricity network 6. A controllable switch 24 is also fitted in series with the choke. The controllable switch closes after the intermediate circuit voltage has risen to a pre-determined limit value, which is here 350 volts. By means of the controllable switch 24 a possible surge current caused by sudden charging of the capacitors 17 in connection with the closing of the main contactor of the network is prevented.

The rectifier 7 of the intermediate circuit power is fitted to the intermediate circuit of the frequency converter via the diodes 12,13. The diode 12 is fitted to conduct current from the positive busbar 4 of the intermediate circuit of the frequency converter to the collector of the positive changeover contact 36 of the changeover switch 10 of the rectifier of the intermediate circuit power. The diode 13 is fitted to conduct current from the emitter of the negative changeover contact 37 of the changeover switch 10 of the rectifier 7 of the intermediate circuit power to the negative busbar 5 of the intermediate circuit of the frequency converter. The diodes connected in this way prevent the supply of power from the electricity network 6 to the motor 2 via the rectifier 7 of the intermediate circuit power, which is important from the standpoint of the safety of the transport system, because in this case malfunctioning of the rectifier 7 of the intermediate circuit power does not in a possible fault situation enable the flow of power creating torque to the motor 2 from the electricity network 6.

FIG. 5 presents a rectifier control 29 of the rectifier of the intermediate circuit power in more detail. The rectifier control 29 is fitted to control the rectifier 7 of the intermediate circuit power in response to intermediate circuit voltage signal 25 of the frequency converter that indicates the power supply of the second power source 2.

The intermediate circuit voltage 25 of the frequency converter 3 is measured and compared by the comparator 40 to the first limit value 38 (U1) of intermediate circuit voltage, which can be, for instance, 680 volts. After the intermediate circuit voltage has increased to be greater than the first limit value 38, the comparator 40 gives permission to the rectifier control 29 to start to control the power supplied to the load 14 from the intermediate circuit 4,5 of the frequency converter with the rectifier 7 of the intermediate circuit power. In this case the intermediate circuit voltage 25 starts to fall. The comparator 40 compares the intermediate circuit voltage to the second limit value 39 (U2) of voltage, which can be, for instance, 650 volts. After the intermediate circuit voltage has decreased to below the second limit value 39, the comparator commands the rectifier control to stop the power supply of the rectifier 7 of the intermediate circuit power.

The amplitude of the current reference of the choke 11, 20 is determined by comparing the reference value 30 of the intermediate circuit voltage of the frequency converter to the intermediate circuit voltage 25 measured with the current regulator 31. The reference value of the intermediate circuit voltage can be, for instance, 650 volts. The amplitude of the current reference grows in proportion to the difference of the reference values and the actual values of the intermediate circuit voltage. The current 26 measured by the choke tries to adjust in the current regulator 33 according to the current reference 29 such that the modulator 35 is controlled by means of the current regulator, by means of which the switching reference of the changeover switch 10 is formed. A pulse width modulator functions as the modulator, in which case the width of the control pulse of the changeover switch is changed according to the output of the current regulator.

In another embodiment the rectifier control 29 differs from the embodiment in FIG. 5 such that the rectifier control does not contain a current regulator 31 at all, but instead the amplitude of the current reference 29 is a constant. In this case after the rectifier control has started the power supply from the intermediate circuit 4,5 to the supplied load 14 with the rectifier 7 of the intermediate circuit power, the current of the load is according to the current reference 29 a constant in terms of its amplitude.

FIG. 6 presents an embodiment of the invention, in which three single-phase rectifiers of the intermediate circuit power are fitted to the power control of the transport system, for supplying power from the intermediate circuit 4,5 of the power supply appliance 3 of the motor to a three-phase electricity network 6. In this case each of the aforementioned single-phase rectifiers 7 of the intermediate circuit power is connected to a different phase of the three-phase electricity network 6. All three single-phase rectifiers 7 of the intermediate circuit power are controlled with a common rectifier control 29. The rectifier control 29 determines the three-phase network current reference such that the currents are phased with each other in accordance with the three-phase system. A communication channel 41 is between the rectifier control and the single-phase rectifiers 7 of the intermediate circuit power, via which the rectifier control sends control commands to the single-phase rectifiers 7 of the intermediate circuit power, for adjusting the network current according to the aforementioned three-phase network current reference. The neutral wire N of the electricity network is also connected to each single-phase rectifier of the intermediate circuit power, in the same way as is described for one rectifier 7 in the embodiment of FIG. 4.

FIG. 7 presents an embodiment of the invention, in which a single-phase rectifier 7 of the intermediate circuit power is fitted to supply to the electricity network 6 the power generated by a solar panel 2 for the power supply circuit 3 of a building. In this embodiment of the invention the power supply to the electrification 42 of the building occurs from the electricity network 6 via the inverter 3. The solar panel 2 is connected to the intermediate circuit 4,5 of the inverter 3 via a separate DC/DC transformer 43 such that the voltage fitting between the solar panel 2 and the DC intermediate circuit 4,5 of the inverter is done with the aforementioned DC/DC transformer 43. The power supply to the electrification 42 of the building can in this case occur wholly or partially from the solar panel 2, in which case at least a part of the power of the electricity supply of the building taken from the electricity network 6 can be replaced with the power supply of the solar panel 2. When the power supply of the solar panel exceeds the power requirement of the electrification 42 of the building, the surplus power is supplied with the single-phase rectifier 7 of the intermediate circuit power from the intermediate circuit 4,5 of the inverter to a phase of the electricity network 6.

It is also possible that at least one accumulator is fitted in connection with the solar panel 2, for the purpose of storing the energy produced by the solar panel.

The invention is not limited solely to the embodiments described above, but instead many variations are possible within the scope of the inventive concept defined by the claims below.

The invention claimed is:

1. A circuit comprising:
   a rectifier of an intermediate circuit power including interfaces to an intermediate circuit of a power supply appliance and a supplied load, wherein the power supply appliance of the intermediate circuit includes interfaces to a first power source and to a second power source; and
   a control, configured to control the rectifier of the intermediate circuit power in response to a signal indicating power supply of the second power source, for supplying to the load the power transmitted to the intermediate circuit from the second power source,
   wherein the rectifier of the intermediate circuit power is single-phase, further comprising:
      a choke and a changeover switch, wherein the choke is fitted between a first connection point of the supplied load and an output of the changeover switch; and
      at least two in-series capacitors connected in parallel with the changeover switch, wherein a second connection point of the supplied load is directly connected between the at least two in-series capacitors.

2. A power control of a transport system, comprising:
   an electric motor for moving a transport appliance;
   a power supply appliance including an intermediate circuit and being fitted between a power source and the electric motor;
   a single-phase rectifier of an intermediate circuit power fitted between the intermediate circuit of the power supply appliance and a supplied load, for supplying power returning to the intermediate circuit from the electric motor onwards to the load, wherein the single-phase rectifier of the intermediate circuit power comprises:
      a choke and a changeover switch, wherein the choke is fitted between a first connection point of the supplied load and an output of the changeover switch; and
      at least two in-series capacitors connected in parallel with the changeover switch, wherein a second connection point of the supplied load is directly connected between the at least two in-series capacitors.

3. The circuit according to claim 1, wherein the rectifier of the intermediate circuit power is controlled according to the connected load.

4. The circuit according to claim 1, wherein the supplied load comprises a power resistor.

5. The circuit according to claim 1, wherein the supplied load comprises a power supply of an electrification of a transport system.

6. The circuit according to claim 1, wherein the rectifier of the intermediate circuit power is fitted to supply power from the intermediate circuit of the power supply appliance of the motor to a phase of the electricity network.

7. The circuit according to claim 1, wherein a positive changeover contact and a negative changeover contact of the rectifier of the intermediate circuit power are controlled into a conductive state simultaneously for the dynamic braking of the motor.

8. The circuit according to claim 1, wherein the rectifier of the intermediate circuit power comprises a measurement of a current of the load, and a status of the load is estimated on the basis of the measured current.

9. The power control according to claim 2, wherein the rectifier of the intermediate circuit power is controlled according to the connected load.

10. The power control according to claim 2, wherein the supplied load comprises a power resistor.

11. The power control according to claim 3, wherein the supplied load comprises a power resistor.

12. The power control according to claim 2, wherein the supplied load comprises a power supply of an electrification of a transport system.

13. The power control according to claim 3, wherein the supplied load comprises a power supply of the electrification of a transport system.

14. The power control according to claim 4, wherein the supplied load comprises a power supply of an electrification of a transport system.

15. The power control according to claim 2, wherein the rectifier of the intermediate circuit power is fitted to supply power from the intermediate circuit of the power supply appliance of the motor to a phase of the electricity network.

16. The power control according to claim 3, wherein the rectifier of the intermediate circuit power is fitted to supply power from the intermediate circuit of the power supply appliance of the motor to a phase of the electricity network.

17. The power control according to claim 4, wherein the rectifier of the intermediate circuit power is fitted to supply power from the intermediate circuit of the power supply appliance of the motor to a phase of the electricity network.

18. The circuit according to claim 1, wherein the rectifier of the intermediate circuit power further comprises a controllable switch connected in series with the choke and is located between the choke and the output of the changeover switch.

19. The circuit according to claim 1, wherein a node is at a joint of the at least two in-series capacitor, and no short circuit exists between the node and the output of the changeover switch.

20. The power control according to claim 2, wherein the rectifier of the intermediate circuit power further comprises a controllable switch connected in series with the choke and is located between the choke and the output of the changeover switch.

21. The power control according to claim 2, wherein a node is at a joint of the at least two in-series capacitor, and no short circuit exists between the node and the output of the changeover switch.

22. A method for controlling the power of a transport system, the method comprising:

fitting a power supply appliance of a motor between a power source and an electric motor;

fitting a single-phase rectifier of an intermediate circuit power between the intermediate circuit of the power supply appliance of the motor and a supplied load;

fitting a changeover switch in the single-phase rectifier of the intermediate circuit power;

fitting a choke between an output of the changeover switch and a first connection point of the supplied load;

connecting at least two in-series connected capacitors in parallel with the changeover switch;

directly connecting a second connection point of the supplied load between the at least two in-series capacitors.

23. The method according to claim 22, further comprising:

measuring an intermediate circuit voltage starting supplying power from the intermediate circuit to the supplied load with the single-phase rectifier of the intermediate circuit power after the intermediate circuit voltage has exceeded a limit value; and stopping supplying power from the intermediate circuit to the supplied load after the intermediate circuit voltage has fallen below the limit value.

24. The method according to claim 22, further comprising:

connecting a controllable switch in series with the choke and locating the controllable switch between the choke and the output of the changeover switch.

25. The method according to claim 22, wherein a node is at a joint of the at least two in-series capacitor, and the step of connecting the at least two in-series connected capacitors in parallel with the changeover switch includes connecting the at least two in-series connected capacitors in parallel with the changeover switch without short-circuiting the node and the output of the changeover switch.

* * * * *